US012574322B2

(12) United States Patent
Jeganathan et al.

(10) Patent No.: US 12,574,322 B2
(45) Date of Patent: Mar. 10, 2026

(54) DATA STRUCTURE ASSOCIATED WITH AN INTERFACE OF A NETWORK DEVICE

(71) Applicant: Juniper Networks, Inc., Sunnyvale, CA (US)

(72) Inventors: Jeyananth Minto Jeganathan, Pleasanton, CA (US); Kaliraj Vairavakkalai, Mountain House, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 386 days.

(21) Appl. No.: 18/191,435

(22) Filed: Mar. 28, 2023

(65) Prior Publication Data

US 2024/0333641 A1    Oct. 3, 2024

(51) Int. Cl.
H04L 45/74 (2022.01)
G06F 16/22 (2019.01)

(52) U.S. Cl.
CPC .......... H04L 45/74 (2013.01); G06F 16/2228 (2019.01)

(58) Field of Classification Search
CPC ....... H04L 45/74; H04L 45/02; H04L 45/745; H04L 61/5007; H04L 63/02; H04L 67/34; G06F 16/2228
See application file for complete search history.

(56) References Cited

U.S. PATENT DOCUMENTS

| | | | | |
|---|---|---|---|---|
| 7,299,296 B1* | 11/2007 | Lo | ............ | H04L 12/66 |
| | | | | 370/231 |
| 11,929,915 B2* | 3/2024 | Chen | ........ | H04L 45/12 |
| 12,120,022 B1* | 10/2024 | Thomas | ..... | H04L 45/74 |
| 2015/0131660 A1* | 5/2015 | Shepherd | ...... | H04L 45/74 |
| | | | | 370/390 |
| 2018/0041438 A1* | 2/2018 | Wood | ..... | H04L 45/306 |
| 2019/0199633 A1* | 6/2019 | Azgin | ..... | H04L 67/63 |
| 2021/0021517 A1* | 1/2021 | Sellappa | ..... | H04L 61/251 |
| 2021/0273827 A1 | 9/2021 | Vairavakkalai et al. | | |
| 2022/0029911 A1 | 1/2022 | Zhang et al. | | |

OTHER PUBLICATIONS

Bahadur, N., et al., "RIB Information Model," Internet Engineering Task Force (IETF), 2018, 28 Pages. [retrieved on Sep. 26, 2018]. Extended European Search Report for Application No. EP23176406.9, mailed Nov. 22, 2023, 14 Pages.

* cited by examiner

*Primary Examiner* — Cheikh T Ndiaye
(74) *Attorney, Agent, or Firm* — Harrity & Harrity, LLP

(57) ABSTRACT

In some implementations, a network device may receive traffic via an interface of the network device. The network device may determine an Internet protocol (IP) address of the traffic. The network device may identify, based on determining the IP address of the traffic, the interface of the network device. The network device may identify a data structure associated with the interface. The network device may determine whether an entry of the data structure is associated with the IP address. The network device may selectively: forward the traffic, based on determining that an entry of the data structure is associated with the IP address, or refrain from forwarding the traffic, based on determining that no entry of the data structure is associated with the IP address.

20 Claims, 10 Drawing Sheets

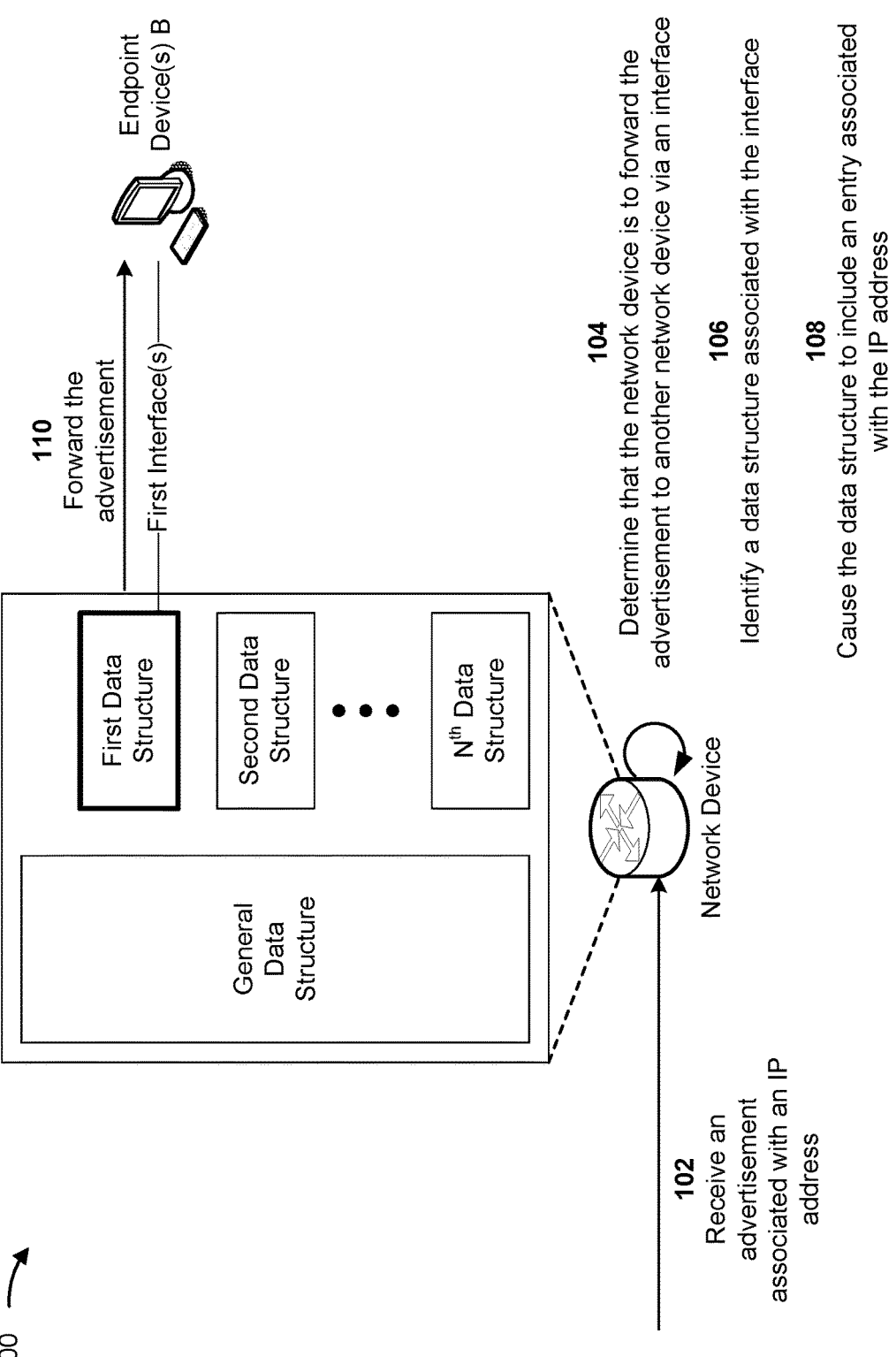

110
Forward the
advertisement

First Interface(s)

Endpoint
Device(s) B

First Data
Structure

Second Data
Structure

N^th Data
Structure

General
Data
Structure

Network Device

102
Receive an
advertisement
associated with an IP
address

104
Determine that the network device is to forward the
advertisement to another network device via an interface 106
Identify a data structure associated with the interface 108
Cause the data structure to include an entry associated
with the IP address

Server device 240

Network 230

Network Device 220

Endpoint Device 210

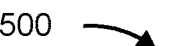

500

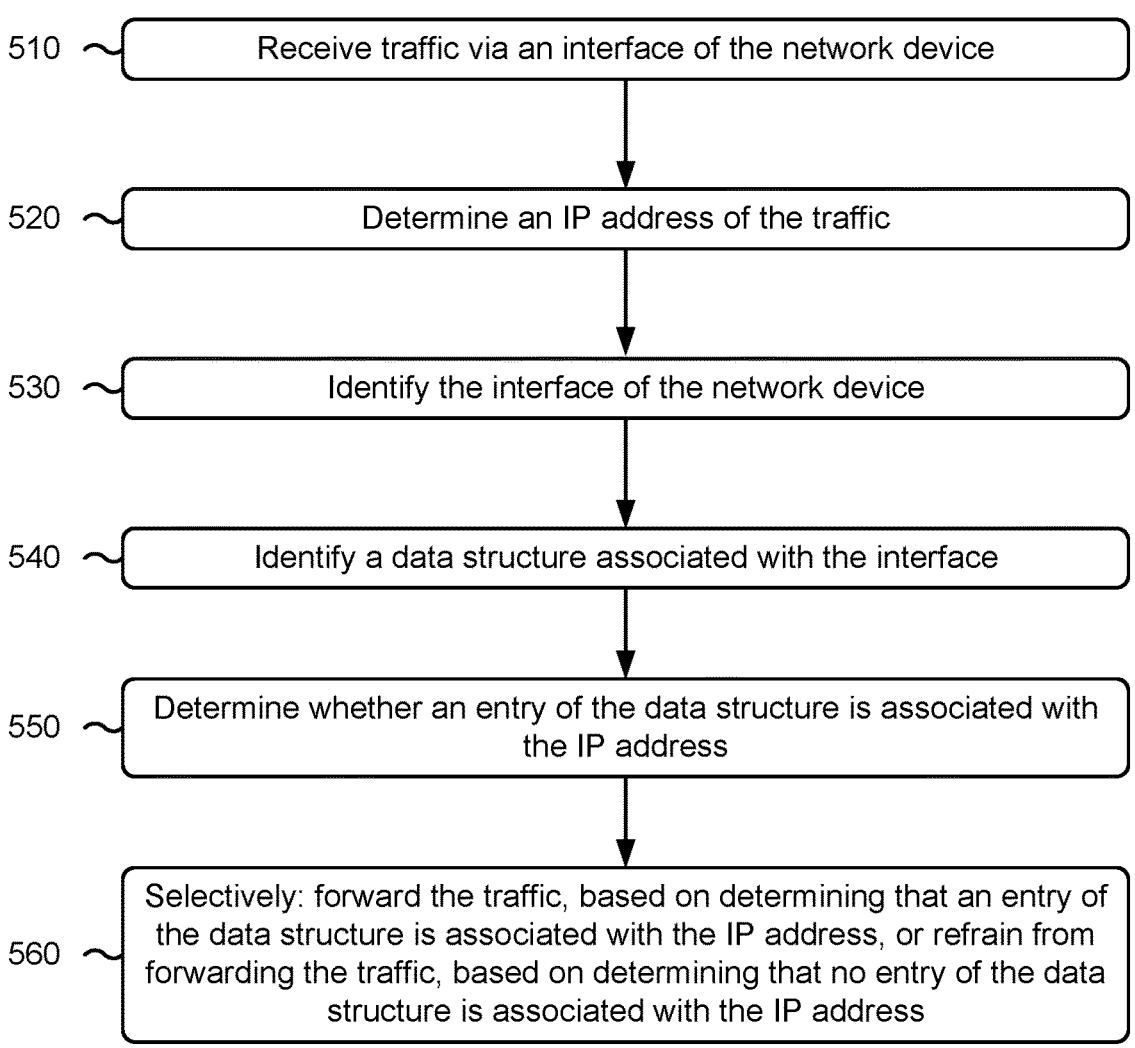

510 — Receive traffic via an interface of the network device

520 — Determine an IP address of the traffic

530 — Identify the interface of the network device

540 — Identify a data structure associated with the interface

550 — Determine whether an entry of the data structure is associated with the IP address 560 — Selectively: forward the traffic, based on determining that an entry of the data structure is associated with the IP address, or refrain from forwarding the traffic, based on determining that no entry of the data structure is associated with the IP address

FIG. 5

DATA STRUCTURE ASSOCIATED WITH AN INTERFACE OF A NETWORK DEVICE

BACKGROUND

A server device can provide services (e.g., cloud services) to endpoint devices (e.g., that subscribe to the services) via a network device (e.g., a router device). Each service may be associated with a particular destination address, such as a particular Internet protocol (IP) address, of the server device.

SUMMARY

In some implementations, a method includes receiving, by a network device, traffic via an interface of the network device; determining, by the network device, an IP address of the traffic; identifying, by the network device and based on determining the IP address of the traffic, the interface of the network device; identifying, by the network device, a data structure associated with the interface; determining, by the network device, whether an entry of the data structure is associated with the IP address; and selectively: forwarding, by the network device, the traffic, based on determining that an entry of the data structure is associated with the IP address, or refraining, by the network device, from forwarding the traffic, based on determining that no entry of the data structure is associated with the IP address.

In some implementations, a network device includes one or more memories; and one or more processors to: determine an IP address of traffic received via an interface of the network device; identify, based on determining the IP address of the traffic, a data structure associated with the interface; determine whether an entry of the data structure is associated with the IP address; and selectively: forward the traffic, based on determining that an entry of the data structure is associated with the IP address, or refrain from forwarding the traffic, based on determining that no entry of the data structure is associated with the IP address.

In some implementations, a non-transitory computer-readable medium storing a set of instructions includes one or more instructions that, when executed by one or more processors of a network device, cause the network device to: receive an advertisement associated with a particular IP address; determine that the network device is to forward the advertisement to another device via an interface of the network device; identify, based on determining that the network device is to forward the advertisement to the other device via the interface, a data structure associated with the interface; and cause, based on the advertisement, the data structure to include a particular entry that is associated with the particular IP address.

BRIEF DESCRIPTION OF THE DRAWINGS

FIGS. 1A-1E are diagrams of one or more example implementations described herein.

FIGS. 5-6 are flowcharts of example processes associated with facilitating forwarding of traffic received via an interface of a network device using a data structure associated with the interface.

DETAILED DESCRIPTION

Figure 1A:
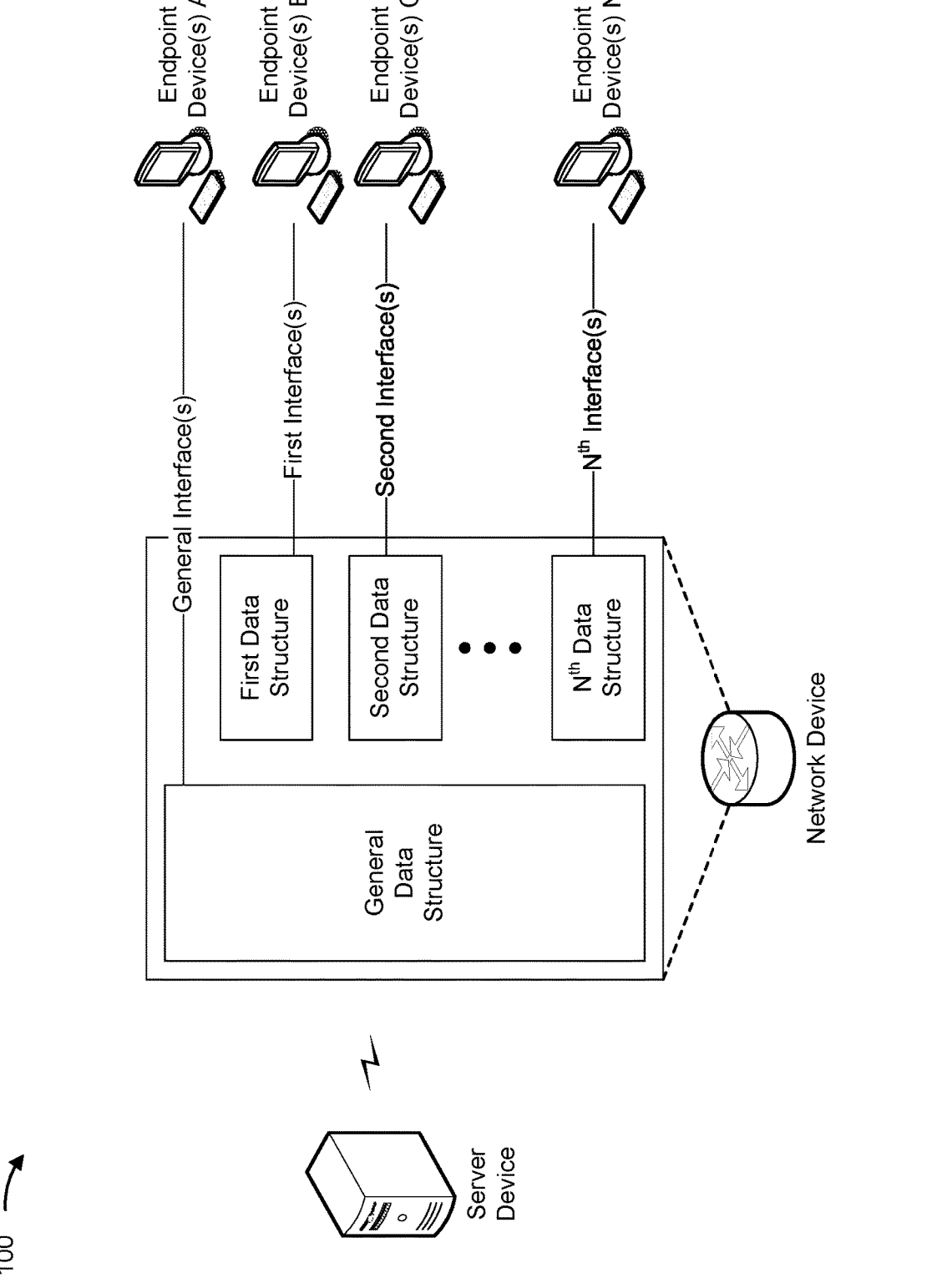

The following detailed description of example implementations refers to the accompanying drawings. The same reference numbers in different drawings may identify the same or similar elements.

As described above, a server device may provide services, via a network device, to endpoint devices that subscribe to the services. Typically, the server device provides a destination address (e.g., a destination IP address) for each service offered by the server device. Accordingly, an endpoint device is provided with (e.g., via a communication protocol, such as via an external border gateway protocol (eBGP)) first destination addresses of the server device that are associated with services to which the endpoint device is subscribed, and is not provided with second destination addresses of the server device that are associated with services to which the endpoint device is not subscribed. The endpoint device therefore can send packets, via the network device, to the first destination addresses to obtain, from the server device, the services to which the endpoint device is subscribed. However, in some cases, the endpoint device may be configured (e.g., manually configured) to access the second destination addresses of services, and therefore can send packets, via the network device, to the second destination addresses to obtain, from the server device, the services to which the endpoint device is not subscribed.

This can result in unauthorized use of services by the endpoint device, and can therefore result in wastage of computing resources (e.g., processing resources, memory resources, communication resources, and/or power resources, among other examples) by the server device, the network device, and the endpoint device to provide the unauthorized services to the endpoint device. Further, in some cases, the endpoint device is able to access the services to which the endpoint device is not subscribed by paying for only the services to which the endpoint device is subscribed, which results in a monetary loss to the organization associated with the services provided by server device.

In some cases, a firewall, or other filter, of the network device can be configured to control traffic to and from each destination address associated with the server device. However, such configuration is typically a manual process that is cumbersome, time-consuming, and prone to error and delay, especially when there are numerous endpoint devices with different service subscription profiles. This is simply not practical to do at scale (e.g., when there are hundreds, thousands, or more endpoint devices). Further, the firewall, or other filter, needs to be manually updated every time there is a change to a service subscription profile of an endpoint device, increasing a likelihood of even more error and delay.

Some implementations described herein provide a network device that provides traffic filtering based on an IP address of the traffic and an interface of the network device via which the traffic is received (e.g., from an endpoint device). The network device may include a data structure (e.g., a forwarding table or similar data structure) that is associated with the interface, and the network device may use the data structure to determine whether to forward, or refrain from forwarding, traffic received via the interface. For example, the data structure may include a plurality of entries, wherein an entry indicates an IP address (or a prefix of an IP address) (e.g., that is associated with a service, such as that provided by a server device) and a forwarding action (e.g., forward or do not forward) for traffic associated with the IP address. In some implementations, the data structure may be associated with particular interfaces of the network device (e.g., a subset of interfaces of the network device), such as those that are associated with endpoint devices that subscribe to particular services. Accordingly, the data structure may have entries associated with IP address of the particular services and the network device may use the data structure to determine whether to forward traffic received from the particular endpoint devices via the particular interfaces. In this way, the data structure needs to only include entries associated with the particular services (e.g., the IP addresses associated with the particular services), and not entries associated with other services or other networking applications.

In this way, the network device facilitates authorized access to services provided by a server device and reduces a likelihood of unauthorized access to services provided by the server device. For example, a data structure associated with the services may be used to facilitate access to only endpoint devices that have authorized access to the services, and any endpoint device that is not associated with an interface of the network device that is associated with the services cannot have its traffic forwarded to request the services. This reduces use of unauthorized services by an endpoint device, and therefore reduces waste of computing resources (e.g., processing resources, memory resources, communication resources, and/or power resources, among other examples) by the server device, the network device, and the endpoint device to provide the unauthorized services to the endpoint device.

Further, because individual data structures may be used to facilitate access to respective sets of services, rather than one general data structure (e.g., a general forwarding table), each data structure may have a reduced number of entries (e.g., as compared to a general data structure). This reduces an amount of computing resources the network device needs to use (e.g., to search a data structure and find a relevant entry) to make a forwarding determination for traffic associated with a set of services.

Further, in some implementations, the server device provides, to the network device, advertisements related to destination addresses associated with the services provided by the server device. The network device uses the advertisements to automatically update entries of associated data structures, and therefore manually configuring a firewall, or other filter, is not needed. Accordingly, error and delay associated with configuring and updating the data structures is minimized, as compared to using a manually configurable firewall.

FIGS. 1A-1E are diagrams of one or more example implementations 100 described herein. As shown in FIGS. 1A-1E, example implementation(s) 100 may include a server device, a network device, and a plurality of endpoint devices. The server device, the network device, and the plurality of endpoint devices are described in more detail below in connection with FIGS. 2-4.

FIG. 1A shows an example configuration of the server device, the network device, and the plurality of endpoint devices. In some implementations, the network device may include a plurality of data structures. For example, as shown in FIG. 1A, the network device may include a general data structure, a first data structure, a second data structure, and so on. Each data structure may be a forwarding data structure (e.g., a forwarding information base (FIB), a forwarding table, a forwarding context, and/or a similar data structure). That is, each data structure may include one or more entries, where an entry indicates a forwarding action for traffic associated with an IP address (or an IP address prefix) that is received by the network device. For example, an entry may indicate that traffic that is associated with an IP address is to be forwarded (e.g., to a next-hop), or, alternatively, is to not be forwarded (e.g., dropped or otherwise prevented from being forwarded).

Each data structure may be associated with one or more interfaces of the network device. For example, the general data structure may be associated with one or more general interfaces of the network device, the first data structure may be associated with one or more first interfaces of the network device, the second data structure may be associated with one or more second interfaces of the network device, and so on. A data structure being associated with an interface indicates that the network device utilizes the data structure to examine traffic (e.g., IP traffic) received by the network device via the interface (e.g., to facilitate forwarding, or to prevent forwarding, of the traffic). The general data structure may be a "default," or "universal" data structure, and therefore may not be explicitly associated with any one interface. For example, the general data structure may be associated with the one or more general interfaces because the one or more general interfaces are not associated with any of the other data structures (e.g., any of the first data structure, the second data structure, and so on).

As shown in FIG. 1A, each set of one or more interfaces of the network device may be associated with one or more endpoint devices of the plurality of endpoint devices (e.g., by respectively connecting the network device to the one or more endpoint devices). For example, the one or more general interfaces of the network device may be associated with one or more endpoint devices A, the one or more first interfaces of the network device may be associated with one or more endpoint devices B, the one or more second interfaces of the network device may be associated with one or more endpoint devices C, and so on. Accordingly, each data structure of the network device may be associated with one or more endpoint devices that are associated with the one or more interfaces that are associated with the data structure. For example, the general data structure may be associated with the one or more endpoint devices A, the first data structure may be associated with the one or more endpoint devices B, the second data structure may be associated with the one or more endpoint devices C, and so on. Accordingly, the network device may utilize the general data structure to examine traffic received from the one or more endpoint devices A via the one or more general interfaces, may utilize the first data structure to examine traffic received from the one or more endpoint devices B via the one or more first interfaces, may utilize the second data structure to examine traffic received from the one or more endpoint devices C via the one or more second interfaces, and so on. In this way, the network device may utilize a particular data structure to examine traffic from a particular endpoint device, based on the interface on which the network device received the traffic, as further described herein.

The server device may provide one or more services, such as one or more cloud application services. Each service may be associated with an IP address (e.g., a unicast IP address or an anycast IP address), such as an IP version 4 (IPv4) address or an IP version 6 (IPv6) address, that is associated with the server device. Accordingly, as further described herein, an endpoint device may send, via the network device, traffic to an IP address associated with the server device to request the server device to provide a service associated with the IP address to the endpoint device.

As shown in FIG. 1B, and by reference number 102, a network device may receive an advertisement. For example, the server device may generate and provide the advertisement to the network device (e.g., to an interface of the network device not associated with an endpoint device), and the network device may receive the advertisement (e.g., via the interface of the network device). This is also referred to as "advertising" the advertisement (e.g., according to a protocol, such as a border gateway protocol (BGP) or an interior gateway protocol (IGP)). The advertisement may be associated with an IP address (e.g., IPv4 address or an IPV6 address), such as an IP address (e.g., a unicast IP address or an anycast IP address) of a service provided by the server device. For example, the advertisement may include a route that indicates the IP address (or a prefix of the IP address) of the service provided by the server device.

As shown by reference number 104, the network device may determine that the network device is to forward the advertisement (e.g., to at least one endpoint device). The network device may determine (e.g., according to a protocol, such as BGP or IGP) that the network device is to forward the advertisement to an endpoint device via an interface of the network device (e.g., to a "peer" device that is connected to the network device by the interface of the network device). For example, with reference to FIG. 1B, the network device may determine that the network device is to forward the advertisement to a particular endpoint device B, of the one or more endpoint devices B, via a first interface of the one or more first interfaces.

As shown by reference number 106, the network device may identify a data structure associated with the interface of the network device (e.g., based on determining that the network device is to forward the advertisement to the endpoint device via the interface of the network device). For example, with reference to FIG. 1B, the network device may identify the first data structure (e.g., because the first data structure is associated with the first interface).

Accordingly, as shown by reference number 108, the network device may cause the data structure to include an entry that is associated with the IP address. For example, with reference to FIG. 1B, the network device may cause the entry to include at least some of the information included in the advertisement. The entry may indicate, for example, that traffic that is associated with the IP address (or a prefix of the IP address) is to be forwarded (e.g., to a next-hop, such as the server device).

As shown by reference number 110, the network device may forward the advertisement, such as to the endpoint device via the interface of the network device. For example, with respect to FIG. 1B, the network device may forward the advertisement to the endpoint device B via the first interface.

While FIG. 1B is directed to one or more examples associated with the network device updating the first data structure to include an entry associated with the IP address, additional examples are contemplated as well. For example, the network device may determine that the network device is to forward the advertisement to an endpoint device C, of the one or more endpoint devices C, via a second interface, of the one or more second interfaces, and may thereby identify and cause the second data structure (e.g., that is associated with the second interface) to include an entry associated with the IP address. As a different example, the network device may determine that the network device is to forward the advertisement to an endpoint device A, of the one or more endpoint devices A, via a general interface, of the one or more general interfaces, and may thereby identify and cause the general data structure (e.g., that is associated with the general interface) to include an entry associated with the IP address.

Figure 1C:
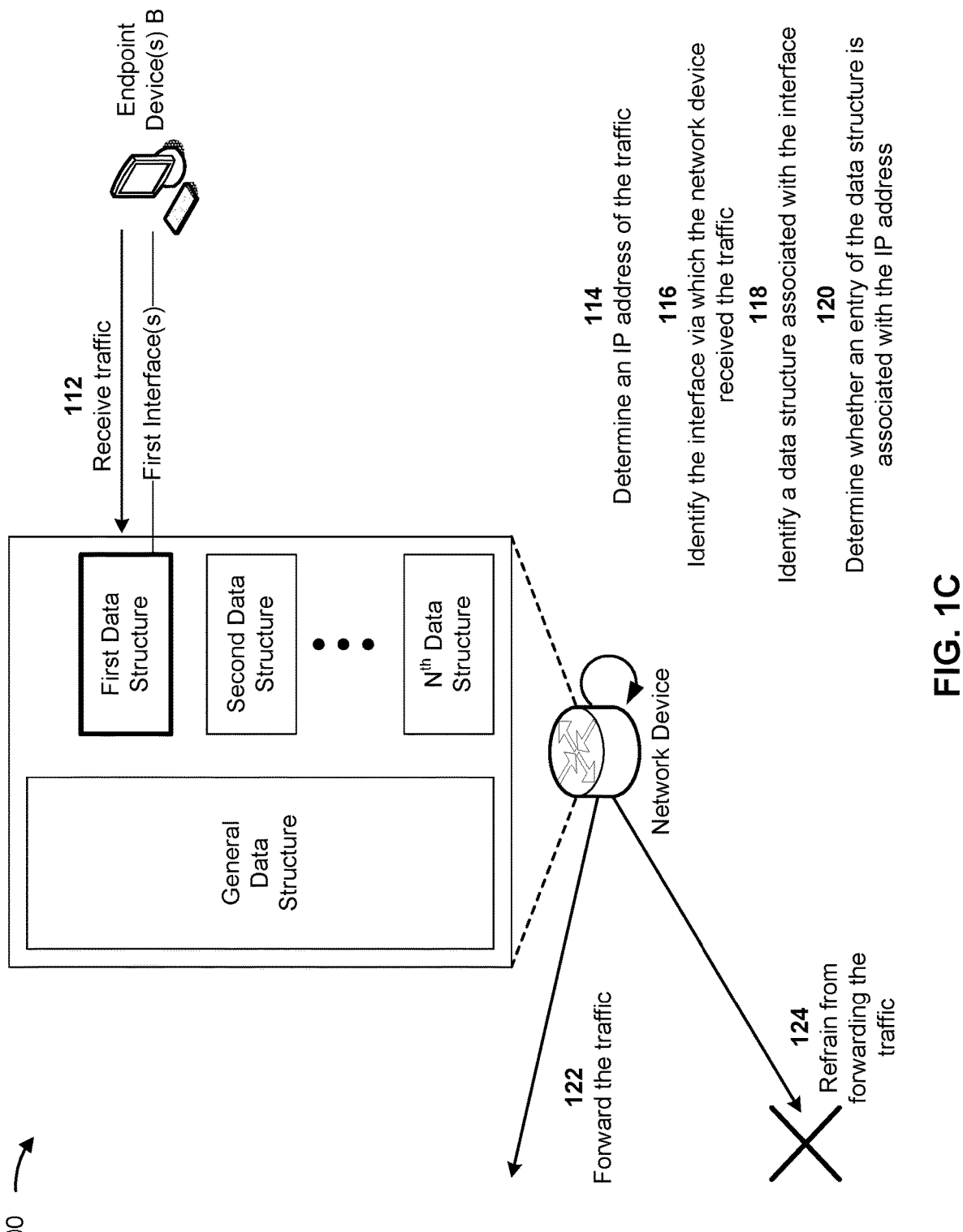

As shown in FIG. 1C, and by reference number 112, a network device may receive traffic via an interface of the network device. For example, with reference to FIG. 1C, an endpoint device B, of the one or more network devices B, may provide the traffic to the network device, and the network device may receive the traffic via a first interface, of the one or more first interfaces, of the network device. The traffic may include an IP address (e.g., an IPV4 address or an IPV6 address), such as an IP address (e.g., a unicast IP address or an anycast IP address) of a service provided by the server device (e.g., as a destination of the traffic), such as in one or more headers of the traffic. Accordingly, the endpoint device B may send the traffic to request the service provided by the server device.

As shown by reference number 114, the network device may determine the IP address of the traffic. For example, the network device may process (e.g., parse and/or read) the traffic to determine the IP address of the traffic. In a particular example, with reference to FIG. 1C, the network device may determine the IP address of the traffic that the network device received from the endpoint device B via the first interface.

As shown by reference number 116, the network device may identify (e.g., based on determining the IP address of the traffic) the interface via which the network device received the traffic. That is, the network device may identify the interface, based on determining that the traffic includes the IP address (and that the network device was able to therefore process the traffic to determine the IP address). For example, with reference to FIG. 1C, the network device may identify the first interface, of the one or more first interfaces, as the interface via which the network device received the traffic from the endpoint device B (e.g., based on determining the IP address of the traffic).

As shown by reference number 118, the network device may identify a data structure associated with the interface (e.g., based on the interface identified by the network device). For example, with reference to FIG. 1C, the network device may identify the first data structure, because the first data structure is associated with the first interface (e.g., that the network device identified as the interface via which the network device received the traffic from the endpoint device B).

As shown by reference number 120, the network device may determine whether an entry of the data structure is associated with the IP address (e.g., of the traffic received by the network device). In some implementations, the network device may search, based on the IP address, the data structure for an entry that is associated with the IP address. For example, with reference to FIG. 1C, the network device may determine whether an entry of the first data structure is associated with the IP address (e.g., whether an IP address prefix included in the entry matches a prefix of the IP address and/or is a longest IP address prefix, of one or more entries of the data structure, that matches the prefix of the IP address).

When the network device determines that an entry of the of data structure is associated with the IP address, the network device may process (e.g., read and/or parse) the entry to determine whether to forward the traffic. In some implementations, when the entry indicates that the network device is to forward the traffic (e.g., to a next hop), the network device may determine to forward the traffic.

Accordingly, as shown by reference number 122, the network device may forward the traffic (e.g., based on the entry of the data structure). For example, with reference to FIG. 1C, the network device may forward the traffic (e.g., based on the entry of the first data structure).

Alternatively, when the entry indicates that the network device is to not forward the traffic (e.g., to drop the traffic), the network device may determine to refrain from forwarding the traffic. Accordingly, as shown by reference number 124, the network device may refrain from forwarding the traffic (e.g., by dropping the traffic). For example, with reference to FIG. 1C, the network device may refrain from forwarding the traffic (e.g., based on the entry of the first data structure). In some implementations, when the network device determines that the data structure does not include an entry associated with the IP address, the network device may determine to refrain from forwarding the traffic.

Figure 1D:
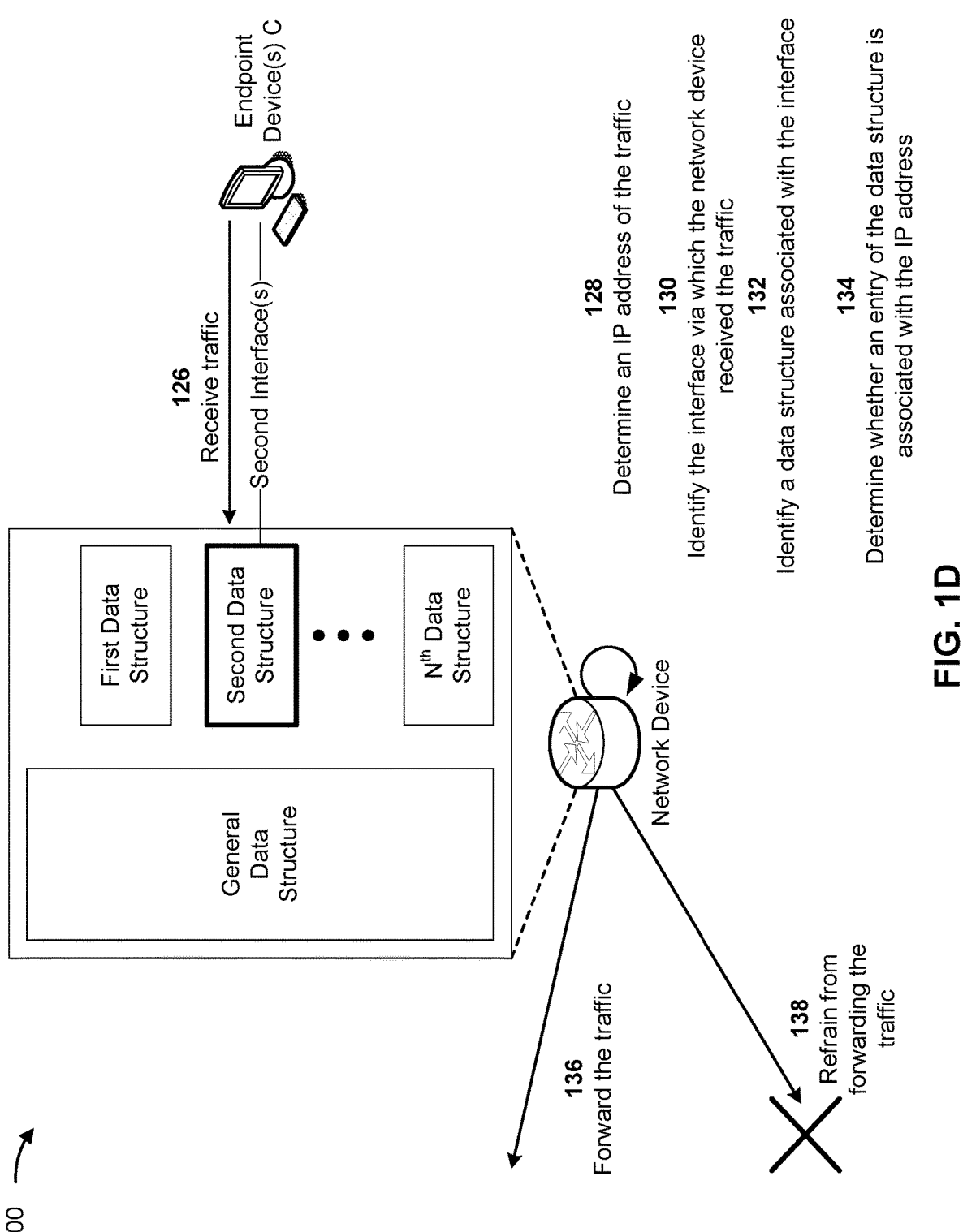

As shown in FIG. 1D, and by reference number 126, the network device may receive traffic (e.g., that is different than the traffic described herein in relation to FIG. 1C) via an interface (e.g., that is different than the interface described herein in relation to FIG. 1C) of the network device. For example, with reference to FIG. 1D, an endpoint device C, of the one or more endpoint devices C, may provide the traffic to the network device, and the network device may receive the traffic via a second interface, of the one or more second interfaces, of the network device. The traffic may include an IP address (e.g., that is the same as, or is different than, the IP address described herein in relation to FIG. 1C) of a service of the server device, such as in one or more headers of the traffic. Accordingly, the endpoint device C may send the traffic to request the service provided by the server device.

As shown by reference number 128, the network device may determine the IP address of the traffic (e.g., in a similar manner as that described herein in relation to FIG. 1C and reference number 114). For example, with reference to FIG. 1D, the network device may determine the IP address of the traffic that the network device received from the endpoint device C via the second interface.

As shown by reference number 130, the network device may identify (e.g., based on determining the IP address of the traffic) the interface via which the network device received the traffic. That is, the network device may identify the interface, based on determining that the traffic includes the IP address (and that the network device was able to therefore process the traffic to determine the IP address). For example, with reference to FIG. 1D, the network device may identify the second interface, of the one or more second interfaces, as the interface via which the network device received the traffic from the endpoint device C (e.g., based on determining the IP address of the traffic).

As shown by reference number 132, the network device may identify a data structure associated with the interface (e.g., based on the interface identified by the network device). For example, with reference to FIG. 1D, the network device may identify the second data structure, because the second data structure is associated with the second interface (e.g., that the network device identified as the interface via which the network device received the traffic from the endpoint device C).

As shown by reference number 134, the network device may determine whether an entry of the data structure is associated with the IP address (e.g., of the traffic received by the network device), such as in a similar manner as that described herein in relation to FIG. 1C and reference number 120. For example, with reference to FIG. 1D, the network device may determine whether an entry of the second data structure is associated with the IP address.

When the network device determines that an entry of the of data structure is associated with the IP address, the network device may process (e.g., read and/or parse) the entry to determine whether to forward the traffic. In some implementations, when the entry indicates that the network device is to forward the traffic (e.g., to a next hop), the network device may determine to forward the traffic. Accordingly, as shown by reference number 136, the network device may forward the traffic (e.g., based on the entry of the data structure). For example, with reference to FIG. 1D, the network device may forward the traffic (e.g., based on the entry of the second data structure).

Alternatively, when the entry indicates that the network device is to not forward the traffic (e.g., to drop the traffic), the network device may determine to refrain from forwarding the traffic. Accordingly, as shown by reference number 138, the network device may refrain from forwarding the traffic (e.g., by dropping the traffic). For example, with reference to FIG. 1D, the network device may refrain from forwarding the traffic (e.g., based on the entry of the second data structure). In some implementations, when the network device determines that the data structure does not include an entry associated with the IP address, the network device may determine to refrain from forwarding the traffic.

Figure 1E:
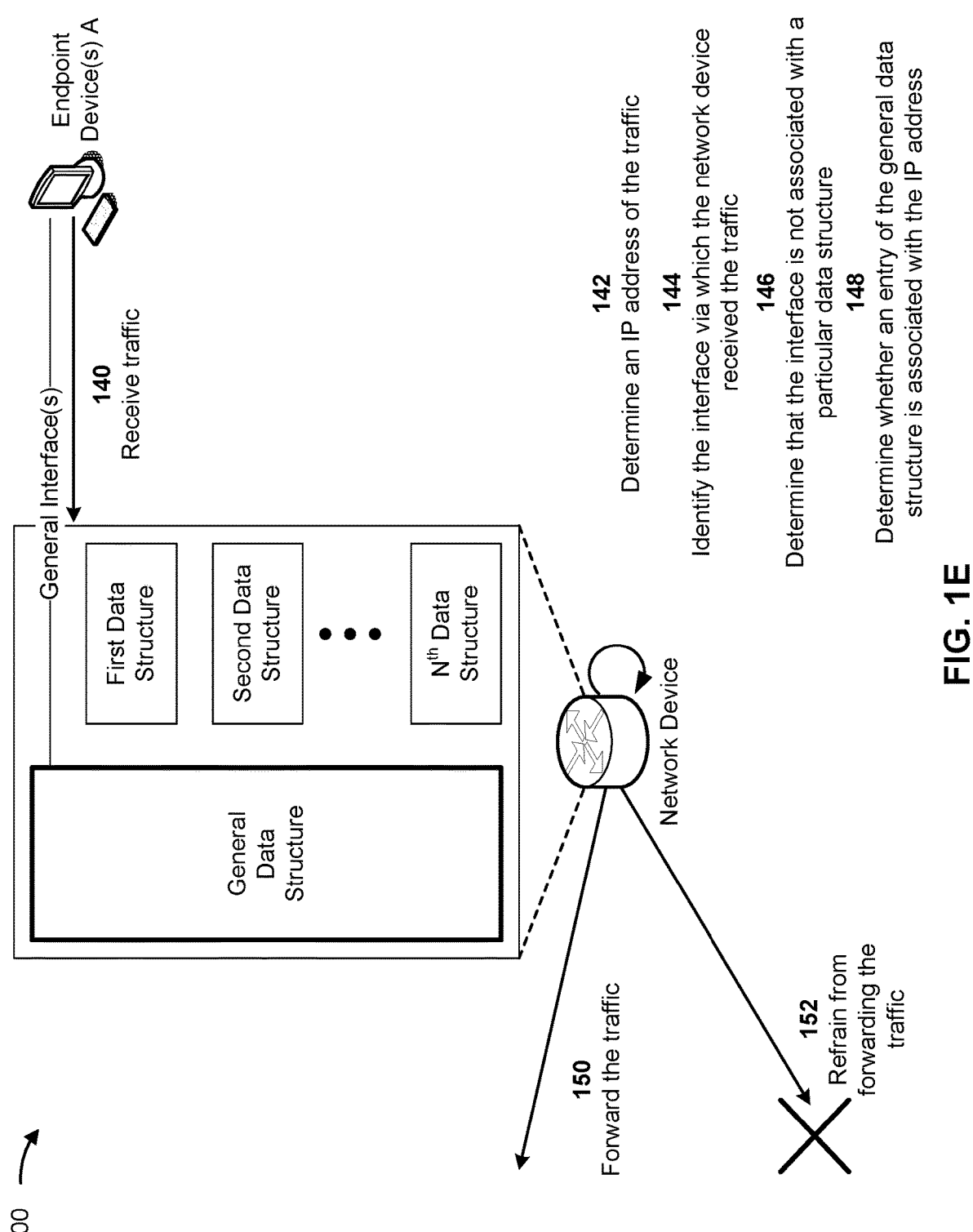

As shown in FIG. 1E, and by reference number 140, the network device may receive traffic (e.g., that is different than the traffic described herein in relation to FIG. 1C and the traffic described herein in relation to FIG. 1D) via an interface (e.g., that is different than the interface described herein in relation to FIG. 1C and the interface described herein in relation to FIG. 1D) of the network device. For example, with reference to FIG. 1E, an endpoint device A, of the one or more endpoint devices A, may provide the traffic to the network device, and the network device may receive the traffic via a general interface, of the one or more general interfaces, of the network device. That is, the network device may receive the traffic via an interface that is not associated with the first data structure, the second data structure, and so on, and therefore (e.g., by default) the interface is a general interface. The traffic may include an IP address (e.g., that is the same as, or is different than, the IP address described herein in relation to FIG. 1C and/or the IP address described herein in relation to FIG. 1D) of a service of the server device, such as in one or more headers of the traffic.

As shown by reference number 142, the network device may determine the IP address of the traffic (e.g., in a similar manner as that described herein in relation to FIG. 1C and reference number 116). For example, with reference to FIG. 1E, the network device may determine the IP address of the traffic that the network device received from the endpoint device A via the general interface.

As shown by reference number 144, the network device may identify (e.g., based on determining the IP address of the traffic) the interface via which the network device received the traffic. That is, the network device may identify the interface, based on determining that the traffic includes the IP address (and that the network device was able to therefore process the traffic to determine the IP address). For example, with reference to FIG. 1E, the network device may identify the general interface, of the one or more general interfaces, as the interface via which the network device received the traffic from the endpoint device A (e.g., based on determining the IP address of the traffic).

As shown by reference number 146, the network device may determine that the interface is not associated with a particular data structure. For example, with reference to FIG. 1E, the network device may determine that the general interface is not associated with the first data structure, the second data structure, and so on. Accordingly, the network device may determine that the interface is associated with the general data structure (e.g., based on determining that the interface is not associated with a particular data structure).

As shown by reference number 148, the network device may determine whether an entry of the general data structure is associated with the IP address (e.g., of the traffic received by the network device), such as in a similar manner as that described herein in relation to FIG. 1C and reference number 120. For example, with reference to FIG. 1E, the network device may determine whether an entry of the general data structure is associated with the IP address.

When the network device determines that an entry of the of the general data structure is associated with the IP address, the network device may process (e.g., read and/or parse) the entry to determine whether to forward the traffic. In some implementations, when the entry indicates that the network device is to forward the traffic (e.g., to a next hop), the network device may determine to forward the traffic. Accordingly, as shown by reference number 150, the network device may forward the traffic (e.g., based on the entry of the general data structure). For example, with reference to FIG. 1E, the network device may forward the traffic (e.g., based on the entry of the general data structure).

Alternatively, when the entry indicates that the network device is to not forward the traffic (e.g., to drop the traffic), the network device may determine to refrain from forwarding the traffic. Accordingly, as shown by reference number 152, the network device may refrain from forwarding the traffic (e.g., by dropping the traffic). For example, with reference to FIG. 1E, the network device may refrain from forwarding the traffic (e.g., based on the entry of the general data structure). In some implementations, when the network device determines that the general data structure does not include an entry associated with the IP address, the network device may determine to refrain from forwarding the traffic.

Figure 2:
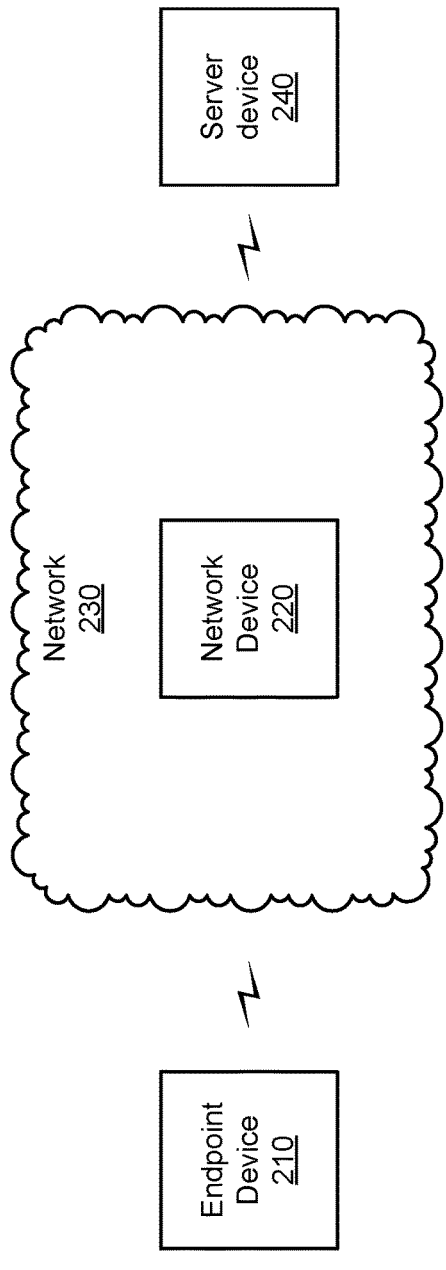
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a plurality of endpoint devices 210, a network device, a network 230, and a server device 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may send traffic to the network device 220 to attempt to access one or more services provided by the server device 240, as described herein.

The network device 220 includes one or more devices capable of receiving, processing, storing, routing, and/or providing traffic in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. The network device 220 may be a consumer edge (CE) network device, a provider edge (PE) network device, a provider (P) network device, and/or another type of network device. In some implementations, the network device 220 may be a physical device implemented within a housing, such as a chassis. In some implementations, the network device 220 may be a virtual device implemented by one or more computer devices of a cloud computing environment or a data center. In some implementations, the network device 220 may include one or more interfaces, and may receive and forward, or refrain from forwarding, traffic, as described herein.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The server device 240 may include one or more devices capable of receiving, generating, storing, processing, providing, and/or information, such as information described herein. The server device 240 may include a communication device and/or a computing device. For example, the server device 240 may include a server, such as an application server, a client server, a web server, a database server, a host server, a proxy server, a virtual server (e.g., executing on computing hardware), or a server in a cloud computing system. In some implementations, the server device 240 may include computing hardware used in a cloud computing environment. In some implementations, the server device may be configured to provide one or more services to the endpoint device 210 via the network device 220, as described herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
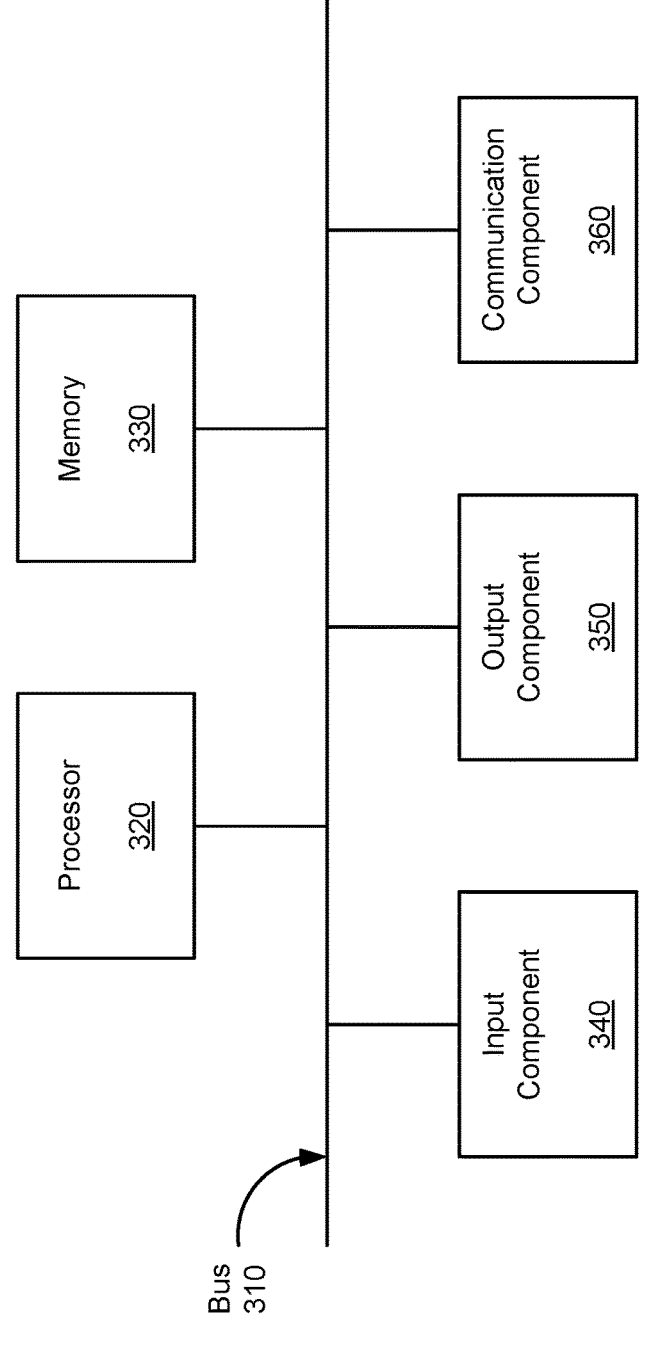
FIG. 3 is a diagram of example components of a device associated with some implementations described herein.

FIG. 3 is a diagram of example components of a device 300 associated with some implementations described herein. The device 300 may correspond to the endpoint device 210, the network device 220, and/or the server device 240. In some implementations, the endpoint device 210, the network device 220, and/or the server device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
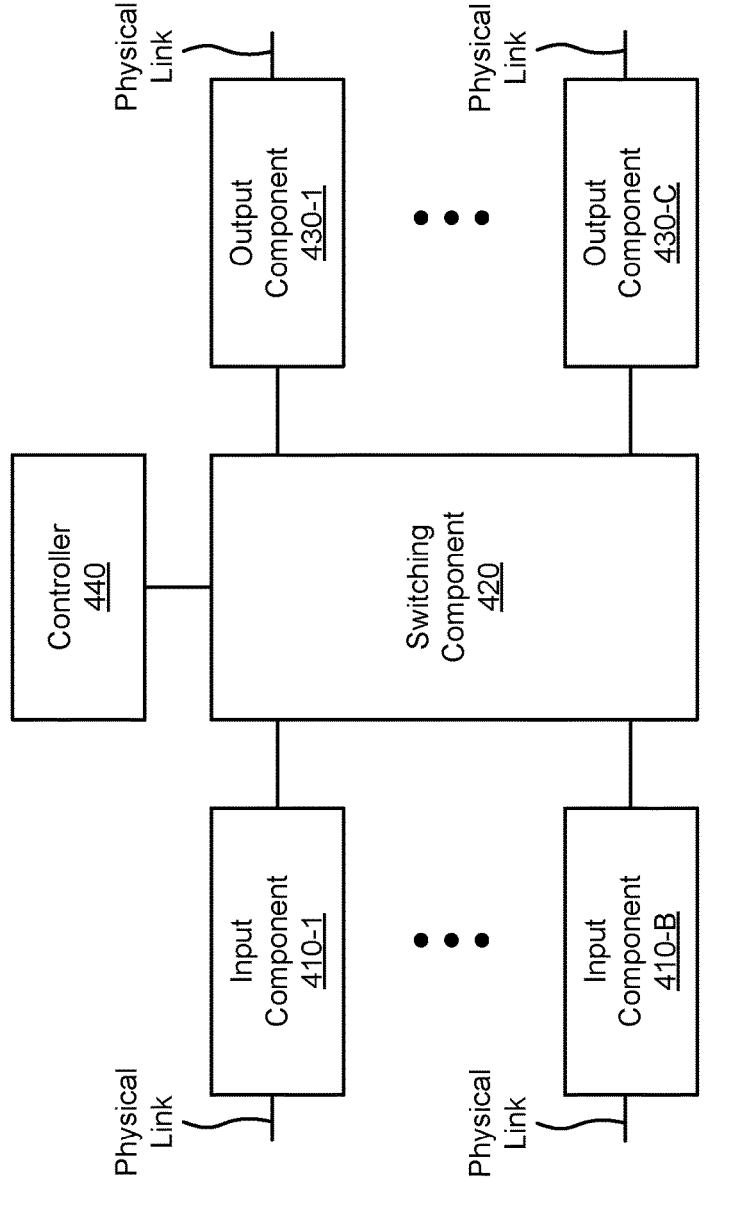
FIG. 4 is a diagram of example components of a device associated with some implementations described herein.

FIG. 4 is a diagram of example components of a device 400 associated with some implementations described herein. Device 400 may correspond to the endpoint device 210, the network device 220, and/or the server device 240. In some implementations, the endpoint device 210, the network device 220, and/or the server device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with facilitating forwarding of traffic received via an interface of a network device using a data structure associated with the interface. In some implementations, one or more process blocks of FIG. 5 are performed by a network device (e.g., the network device 220). In some implementations, one or more process blocks of FIG. 5 are performed by another device or a group of devices separate from or including the network device, such as an endpoint device (e.g., the endpoint device 210) and/or a server device (e.g., the server device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include receiving traffic via an interface of the network device (block 510). For example, the network device may receive traffic via an interface of the network device, as described above.

As further shown in FIG. 5, process 500 may include determining an IP address of the traffic (block 520). For example, the network device may determine an IP address of the traffic, as described above.

As further shown in FIG. 5, process 500 may include identifying the interface of the network device (block 530). For example, the network device may identify, based on determining the IP address of the traffic, the interface of the network device, as described above.

As further shown in FIG. 5, process 500 may include identifying a data structure associated with the interface (block 540). For example, the network device may identify a data structure associated with the interface, as described above.

As further shown in FIG. 5, process 500 may include determining whether an entry of the data structure is associated with the IP address (block 550). For example, the network device may determine whether an entry of the data structure is associated with the IP address, as described above.

As further shown in FIG. 5, process 500 may include selectively: forwarding the traffic, based on determining that an entry of the data structure is associated with the IP address, or refraining from forwarding the traffic, based on determining that no entry of the data structure is associated with the IP address (block 560). For example, the network device may selectively: forward the traffic, based on determining that an entry of the data structure is associated with the IP address, or refrain from forwarding the traffic, based on determining that no entry of the data structure is associated with the IP address, as described above.

Process 500 may include additional implementations, such as any single implementation or any combination of implementations described below and/or in connection with one or more other processes described elsewhere herein.

In a first implementation, the network device includes another data structure that is not associated with the interface of the network device, and process 500 includes receiving other traffic via another interface of the network device; determining another IP address of the other traffic; identifying, based on determining the other IP address of the other traffic, the other interface of the network device; determining that the other interface is not associated with the data structure; determining, based on determining that the other interface is not associated with the data structure, whether the other data structure includes an entry that is associated with the other IP address; and selectively forwarding the other traffic, based on determining that the other data structure includes an entry that is associated with the other IP address, or refraining from forwarding the other traffic, based on determining that the other data structure does not include any entry that is associated with the other IP address.

In a second implementation, the network device includes another data structure that is associated with another interface of the network device, and that is not associated with the interface of the network device, and process 500 includes receiving other traffic via the other interface of the network device; determining another IP address of the other traffic; identifying, based on determining the other IP address of the other traffic, the other interface of the network device; identifying the other data structure associated with the other interface; determining whether an entry of the other data structure is associated with the other IP address; and selectively forwarding the other traffic, based on determining that an entry of the other data structure is associated with the other IP address, or refraining from forwarding the other traffic, based on determining that no entry of the other data structure is associated with the other IP address.

In a third implementation, process 500 includes receiving, prior to receiving the traffic, an advertisement associated with the IP address; determining that the network device is to forward the advertisement to another device via the interface; identifying, based on determining that the network device is to forward the advertisement to the other device via the interface, the data structure associated with the interface; and causing, based on the advertisement, the data structure to include the entry that is associated with the IP address.

In a fourth implementation, the IP address is associated with a service of a server device.

In a fifth implementation, the IP address is a unicast IP address or an anycast IP address.

In a sixth implementation, the data structure is associated with the interface and one or more other interfaces of the network device, and wherein the data structure is a forwarding context for respective traffic received via the interface and the one or more other interfaces from other devices.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
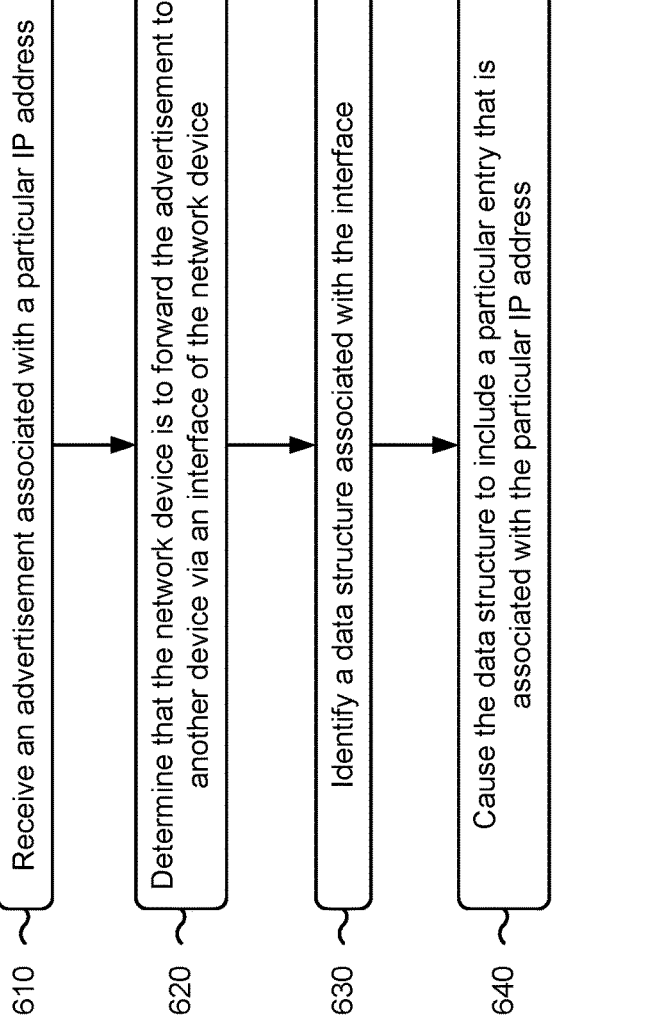

FIG. 6 is a flowchart of an example process 600 associated with facilitating forwarding of traffic received via an interface of a network device using a data structure associated with the interface. In some implementations, one or more process blocks of FIG. 6 are performed by a network device (e.g., the network device 220). In some implementations, one or more process blocks of FIG. 6 are performed by another device or a group of devices separate from or including the network device, such as an endpoint device (e.g., the endpoint device 210) and/or a server device (e.g., the server device 240). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 6, process 600 may include receiving an advertisement associated with a particular IP address (block 610). For example, the network device may receive an advertisement associated with a particular IP address, as described above.

As further shown in FIG. 6, process 600 may include determining that the network device is to forward the advertisement to another device via an interface of the network device (block 620). For example, the network device may determine that the network device is to forward the advertisement to another device via an interface of the network device, as described above.

As further shown in FIG. 6, process 600 may include identifying a data structure associated with the interface (block 630). For example, the network device may identify, based on determining that the network device is to forward the advertisement to the other device via the interface, a data structure associated with the interface, as described above.

As further shown in FIG. 6, process 600 may include causing the data structure to include a particular entry that is associated with the particular IP address (block 640). For example, the network device may cause, based on the advertisement, the data structure to include a particular entry that is associated with the particular IP address, as described above.

Process 600 may include additional implementations, such as any single implementation or any combination of implementations described below and/or in connection with one or more other processes described elsewhere herein.

In a first implementation, process 600 includes receiving, after causing the data structure to include the particular entry that is associated with the particular IP address, traffic via the interface of the network device; determining an IP address of the traffic, identifying, based on determining the IP address of the traffic, that the traffic was received via the interface of the network device; identifying, based on identifying that the traffic was received via the interface of the network device, the data structure associated with the interface; determining whether an entry of the data structure is associated with the IP address; and selectively forwarding the traffic, based on determining that an entry of the data structure is associated with the IP address, or refraining from forwarding the traffic, based on determining that no entry of the data structure is associated with the IP address.

In a second implementation, process 600 includes receiving, after causing the data structure to include the particular entry that is associated with the particular IP address, other traffic via another interface of the network device; determining an IP address of the traffic; identifying, based on determining the IP address of the traffic, that the traffic was received via the other interface of the network device; determining that the other interface is not associated with the data structure; determining, based on determining that the other interface is not associated with the data structure, whether another data structure includes an entry that is associated with the IP address; and selectively forwarding the traffic, based on determining that the other data structure includes an entry that is associated with the IP address, or refraining from forwarding the other traffic, based on determining that the other data structure does not include any entry that is associated with the IP address.

In a third implementation, process 600 includes receiving, after causing the data structure to include the particular entry that is associated with the particular IP address, other traffic via another interface of the network device; determining an IP address of the traffic; identifying, based on determining the IP address of the traffic, that the traffic was received via the other interface of the network device; identifying another data structure associated with the other interface; determining whether an entry of the other data structure is associated with the IP address; and selectively forwarding the traffic, based on determining that an entry of the other data structure is associated with the IP address, or refraining from forwarding the traffic, based on determining that no entry of the other data structure is associated with the IP address.

In a fourth implementation, the particular IP address is a unicast IP address or an anycast IP address.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a network device and from a first endpoint device, traffic via a first interface of a plurality of interfaces of the network device, wherein different interfaces of the plurality of interfaces are associated with different endpoint devices that include the first endpoint device, wherein a plurality of data structures are associated with the plurality of interfaces, wherein different data structures of the plurality of data structures are associated with different interfaces, and wherein the network device further includes a general interface that is not associated with the plurality of data structures;

determining, by the network device, an Internet protocol (IP) address of the traffic;

identifying, by the network device and based on determining the IP address of the traffic, the first interface of the network device as the interface via which the network device received the traffic from the first endpoint device;

identifying, by the network device, a first data structure, from the plurality of data structures, that is associated with the first interface;

determining, by the network device, whether an entry of the first data structure is associated with the IP address; and selectively:

forwarding, by the network device, the traffic, based on determining that an entry of the first data structure is associated with the IP address, or refraining, by the network device, from forwarding the traffic, based on determining that no entry of the first data structure is associated with the IP address.

2. The method of claim 1, wherein the network device includes a second data structure that is not associated with the first interface of the network device, the method further comprising:

receiving other traffic via a second interface of the plurality of interfaces of the network device;

determining another IP address of the other traffic;

identifying, based on determining the other IP address of the other traffic, the second interface of the network device;

determining that the second interface is not associated with the first data structure;

determining, based on determining that the second interface is not associated with the first data structure, whether the second data structure includes an entry that is associated with the other IP address; and selectively:

forwarding the other traffic, based on determining that the second data structure includes an entry that is associated with the other IP address, or refraining from forwarding the other traffic, based on determining that the second data structure does not include any entry that is associated with the other IP address.

3. The method of claim 1, wherein the network device includes a second data structure that is associated with a second interface of the network device, and that is not associated with the first interface of the network device, the method further comprising:

receiving other traffic via the second interface of the network device;

determining another IP address of the other traffic;

identifying, based on determining the other IP address of the other traffic, the second interface of the network device;

identifying the second data structure associated with the second interface;

determining whether an entry of the second data structure is associated with the other IP address; and selectively:

forwarding the other traffic, based on determining that an entry of the second data structure is associated with the other IP address, or refraining from forwarding the other traffic, based on determining that no entry of the second data structure is associated with the other IP address.

4. The method of claim 1, further comprising:

receiving, prior to receiving the traffic, an advertisement associated with the IP address;

determining that the network device is to forward the advertisement to another device via the first interface;

identifying, based on determining that the network device is to forward the advertisement to the other device via the first interface, the first data structure associated with the first interface; and causing, based on the advertisement, the first data structure to include the entry that is associated with the IP address.

5. The method of claim 1, wherein the IP address is associated with a service of a server device.

6. The method of claim 1, wherein the IP address is a unicast IP address or an anycast IP address.

7. A network device, comprising:

one or more memories; and one or more processors to:

determine an Internet protocol (IP) address of traffic received from a first endpoint device via a first interface of a plurality of interfaces of the network device, wherein different interfaces of the plurality of interfaces are associated with different endpoint devices that include the first endpoint device, wherein a plurality of data structures are associated with the plurality of interfaces, wherein different data structures of the plurality of data structures are associated with different interfaces, and wherein the network device further includes a general interface that is not associated with the plurality of data structures;

identify, based on determining the IP address of the traffic, the first interface of the network device as the interface via which the network device received the traffic from the first endpoint device;

identify, based on determining the IP address of the traffic, a first data structure of the plurality of data structures associated with the interface;

determine whether an entry of the first data structure is associated with the IP address; and selectively:

forward the traffic, based on determining that an entry of the first data structure is associated with the IP address, or refrain from forwarding the traffic, based on determining that no entry of the first data structure is associated with the IP address.

8. The network device of claim 7, wherein the network device includes a second data structure that is not associated with the first interface and that is used by the network device to facilitate forwarding of traffic received via a second interface of the network device.

9. The network device of claim 7, wherein the network device includes another data structure that is not associated with the interface of the network device, the one or more processors further to:

determine another IP address of other traffic received via a second interface of the network device;

determine, based on determining the other IP address of the other traffic, that the second interface is not associated with the first data structure;

determine, based on determining that the second interface is not associated with the first data structure, whether a second data structure includes an entry that is associated with the other IP address; and selectively:

forward the other traffic, based on determining that the second data structure includes an entry that is associated with the other IP address, or refrain from forwarding the other traffic, based on determining that the second data structure does not include any entry that is associated with the other IP address.

10. The network device of claim 7, wherein the one or more processors are further to:

receive other traffic;

determine another IP address of the other traffic;

identify, based on determining the other IP address of the other traffic, a second data structure associated with a second interface;

determine whether an entry of the second data structure is associated with the other IP address; and selectively:

forward the other traffic, based on determining that an entry of the second data structure is associated with the other IP address, or refrain from forwarding the other traffic, based on determining that no entry of the second data structure is associated with the other IP address.

11. The network device of claim 10, wherein the first data structure is not associated with the second interface, and wherein the second data structure is not associated with the first interface.

12. The network device of claim 7, wherein the one or more processors are further to:

identify, prior to receiving the traffic and based on an advertisement associated with the IP address that is to be forwarded to another device via the first interface, the first data structure associated with the first interface; and cause, based on the advertisement, the first data structure to include the entry that is associated with the IP address.

13. The network device of claim 7, wherein the IP address is associated with a service.

14. The network device of claim 7, wherein the IP address is a unicast IP address or an anycast IP address.

15. A non-transitory computer-readable medium storing a set of instructions, the set of instructions comprising:

one or more instructions that, when executed by one or more processors of a network device, cause the network device to:

receive an advertisement associated with a particular Internet protocol (IP) address;

determine that the network device is to forward the advertisement to another device via a first interface of a plurality of interfaces of the network device, wherein different interfaces of the plurality of interfaces are associated with different endpoint devices that include a first endpoint device, wherein a plurality of data structures are associated with the plurality of interfaces, wherein different data structures of the plurality of data structures are associated with different interfaces, and wherein the network device further includes a general interface that is not associated with the plurality of data structures;

identify, based on determining that the network device is to forward the advertisement to the other device via the first interface, a first data structure associated with the interface; and cause, based on the advertisement, the first data structure to include a particular entry that is associated with the particular IP address.

16. The non-transitory computer-readable medium of claim 15, wherein the one or more instructions further cause the network device to:

receive, after causing the first data structure to include the particular entry that is associated with the particular IP address, traffic via the first interface of the network device;

determine an IP address of the traffic;

identify, based on determining the IP address of the traffic, that the traffic was received via the first interface of the network device;

identify, based on identifying that the traffic was received via the first interface of the network device, the first data structure associated with the first interface;

determine whether an entry of the first data structure is associated with the IP address; and selectively:

forward the traffic, based on determining that an entry of the first data structure is associated with the IP address, or refrain from forwarding the traffic, based on determining that no entry of the first data structure is associated with the IP address.

17. The non-transitory computer-readable medium of claim 15, wherein the one or more instructions further cause the network device to:

receive, after causing the first data structure to include the particular entry that is associated with the particular IP address, other traffic via a second interface of the network device;

determine an IP address of the traffic;

identify, based on determining the IP address of the traffic, that the traffic was received via the second interface of the network device;

determine that the second interface is not associated with the first data structure;

determine, based on determining that the other interface is not associated with the first data structure, whether a second data structure includes an entry that is associated with the IP address; and selectively:

forward the traffic, based on determining that the second data structure includes an entry that is associated with the IP address, or refrain from forwarding the other traffic, based on determining that the second data structure does not include any entry that is associated with the IP address.

18. The non-transitory computer-readable medium of claim 15, wherein the one or more instructions further cause the network device to:

receive, after causing the data structure to include the particular entry that is associated with the particular IP address, other traffic via a second interface of the network device;

determine an IP address of the traffic;

identify, based on determining the IP address of the traffic, that the traffic was received via the second interface of the network device;

identify a second data structure associated with the second interface;

determine whether an entry of the second data structure is associated with the IP address; and selectively:

forward the traffic, based on determining that an entry of the second data structure is associated with the IP address, or refrain from forwarding the traffic, based on determining that no entry of the second data structure is associated with the IP address.

19. The non-transitory computer-readable medium of claim 15, wherein the particular IP address is a unicast IP address or an anycast IP address.

20. The non-transitory computer-readable medium of claim 15, wherein the IP address is associated with a service of a server device.

* * * * *